US011405329B1

(12) United States Patent
Cuthbert et al.

(10) Patent No.: US 11,405,329 B1
(45) Date of Patent: Aug. 2, 2022

(54) CLOUD RESOURCE PLACEMENT

(71) Applicant: Amazon Technologies, Inc., Seattle, WA (US)

(72) Inventors: David Allen Cuthbert, Bainbridge Island, WA (US); Stefan Letz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 15/900,561

(22) Filed: Feb. 20, 2018

(51) Int. Cl.
*G06F 15/173* (2006.01)
*H04L 47/80* (2022.01)
*G06N 20/00* (2019.01)
*H04L 67/52* (2022.01)

(52) U.S. Cl.
CPC .............. *H04L 47/80* (2013.01); *G06N 20/00* (2019.01); *H04L 67/52* (2022.05)

(58) Field of Classification Search
CPC ... H04L 67/10; H04L 41/0806; G06F 9/5072; G06F 11/0709; G06F 11/0793
See application file for complete search history.

(56) References Cited

U.S. PATENT DOCUMENTS

| 7,877,250 | B2* | 1/2011 | Oslake | G06F 8/20 703/22 |
|---|---|---|---|---|
| 9,336,030 | B1* | 5/2016 | Marr | G06F 9/45533 |
| 9,426,030 | B1* | 8/2016 | Anerousis | H04L 41/0859 |
| 9,451,393 | B1* | 9/2016 | Cullen | H04L 67/1036 |
| 9,804,890 | B1* | 10/2017 | Pai | G06F 9/50 |
| 2011/0022694 | A1* | 1/2011 | Dalal | H04L 41/0856 709/222 |
| 2012/0023223 | A1* | 1/2012 | Branch | G06F 9/4856 709/224 |
| 2013/0117806 | A1* | 5/2013 | Parthasarathy | G06F 21/53 726/1 |
| 2013/0185433 | A1* | 7/2013 | Zhu | H04L 67/303 709/226 |
| 2014/0089495 | A1* | 3/2014 | Akolkar | H04L 41/147 709/224 |
| 2014/0173024 | A1* | 6/2014 | Burba | H04L 67/1004 709/217 |
| 2014/0244842 | A1* | 8/2014 | Rosensweig | G06F 9/5072 709/226 |

(Continued)

*Primary Examiner* — Brian Whipple
*Assistant Examiner* — Gregory P Tolchinsky
(74) *Attorney, Agent, or Firm* — Lee & Hayes, P.C.

(57) ABSTRACT

A service provider may select one or more physical locations of existing data centers for the user for deployment of the user's computing resources. In various embodiments, the service provider may collect parameters from the user to create a custom selection of physical locations for computing services to be deployed for the user, which may be a strategically selected subset of all of the existing data centers available. Some parameters for selection may include expected location of end-users, cost tolerance, latency tolerance, and fault risk diversity. In some situations, cost may have an inverse relationship with latency, such that as cost increases, latency decreases (and vice versa). The rule sets may be created using the parameters, possibly with weights assigned to different parameters based on information received via the user interface. The rule sets may be formed and used to select physical locations for deployment of computing resources.

20 Claims, 11 Drawing Sheets

(56) References Cited

U.S. PATENT DOCUMENTS

| | | | |
|---|---|---|---|
| 2015/0095497 A1* | 4/2015 | Caputo | H04L 67/16 |
| | | | 709/226 |
| 2015/0180730 A1* | 6/2015 | Felstaine | H04L 41/022 |
| | | | 709/225 |
| 2015/0193468 A1* | 7/2015 | Singh | H04W 4/021 |
| | | | 707/724 |
| 2015/0295788 A1* | 10/2015 | Witzman | H04L 41/5006 |
| | | | 709/224 |
| 2016/0134558 A1* | 5/2016 | Steinder | H04L 47/783 |
| | | | 709/226 |
| 2016/0380908 A1* | 12/2016 | Larsson | G06F 9/5072 |
| | | | 709/226 |
| 2017/0344618 A1* | 11/2017 | Horowitz | G06F 16/2365 |
| 2018/0032362 A1* | 2/2018 | Buil | G06F 9/4856 |
| 2019/0230462 A1* | 7/2019 | McLarty | H04W 4/02 |

\* cited by examiner

CLOUD RESOURCE PLACEMENT

BACKGROUND

Network and computing service administration often requires many decisions, such as where to place computing resources and how to allocate current computing resources to serve the needs of end-users. In distributed computing systems, also called cloud computing systems, some decisions may be made on behalf of users while at least some users may be empowered to make certain decisions related to administration of computing resources. However, not all users have the same abilities and understanding to make optimal decisions. Advanced or sophisticated users, such as large technology companies, may desire an ability to customize their services, which may require empowering these users to make more decisions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
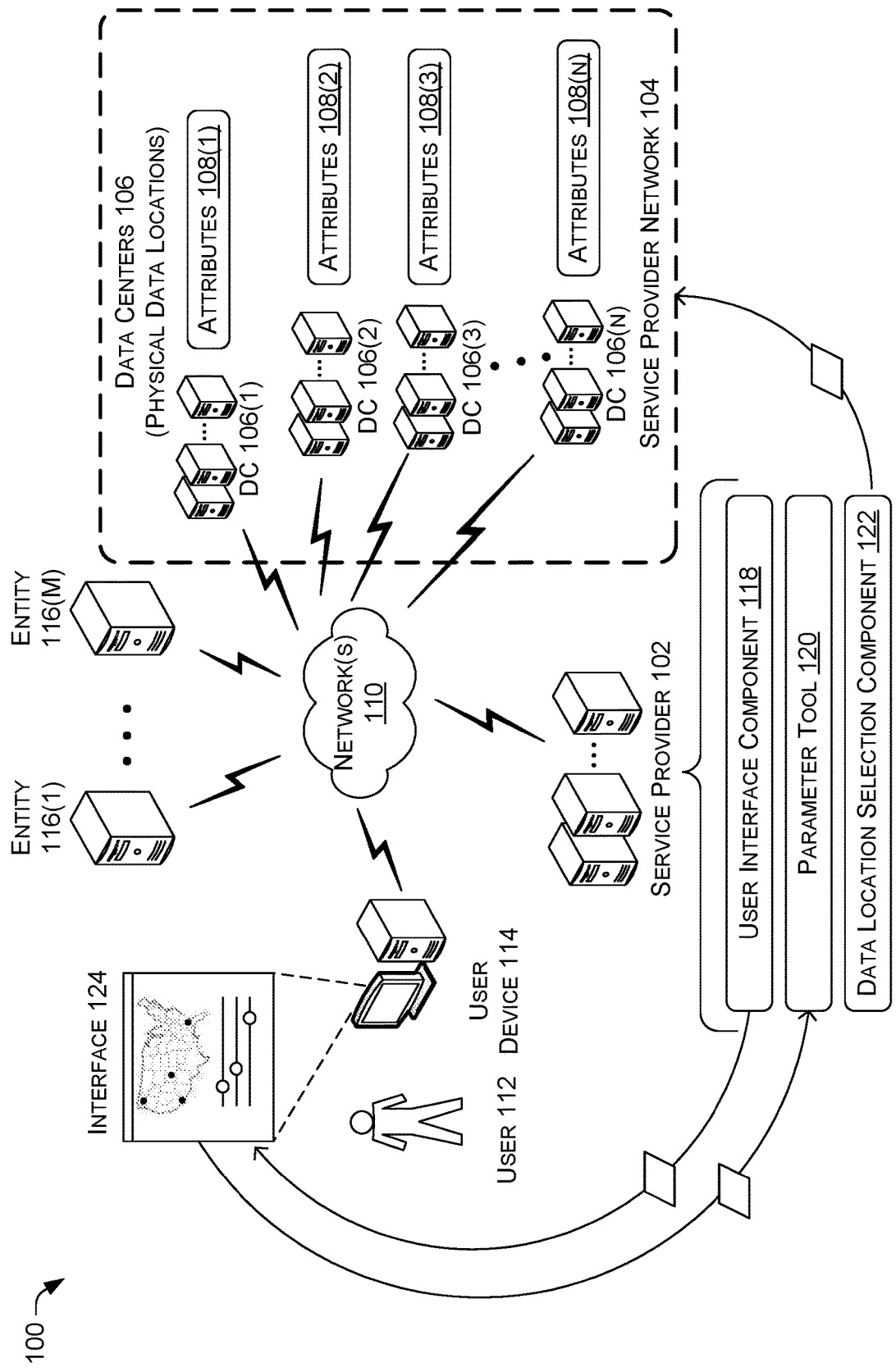
FIG. 1 is a schematic diagram of an illustrative environment that includes a service provider to assist users in selecting physical locations to deploy computing resources.

This disclosure is directed to determining physical locations for computing resources allocated to users to perform computing services, such as data storage and/or compute services (e.g., software code, algorithms, streaming services, etc.). These computing resources, or data centers, may be distributed across various regions and even different countries, and may be collectively referred to as cloud computing resources or as a service provider network. The computing devices may include virtual machines, shared devices, stand-alone devices, and/or other hybrid configurations. The service provider network may have tens, hundreds, or thousands of data centers located all over a region, a country, or in many countries.

Users may desire to deploy computing services at certain existing data centers. In some embodiments, a service provider may automatically select a physical location of an existing data center for the user for deployment of the user's computing resources. In various embodiments, the service provider may collect some information from the user to create a custom selection of physical locations for computing services to be deployed for the user, which may be a strategically selected subset of all of the existing data centers available. Some parameters for selection may include expected location of end-users, cost tolerance, latency tolerance, and fault risk diversity. In some situations, cost may have an inverse relationship with latency, such that as cost increases, latency decreases (and vice versa). The parameters may be used to represent other parameters, or may be used with other parameters, such as: proximity to a large population area, proximity to existing resources, data compliance requirements (including data sovereignty), fault domain diversity, inter-node latency, latency to end-user, service provider cost, inter-system data transfer cost, inter-region data transfer cost, and/or network transmission cost.

In various embodiments, the service provider may provide a user interface to enable a user request auto-selection of physical locations, select basic parameters used to select physical locations, or provide detailed rules to accommodate selection of physical locations of the computing resources. The parameters may be selected using user interface controls, such as sliders or other controls that may be manipulated by users to provide inputs to the service provider. Ultimately, rule sets may be formed and used to select physical locations for deployment of computing resources. The rule sets may be created using the parameters, possibly with weights assigned to different parameters based on information received via the user interface. In some embodiments, the rule sets may be created manually or by editing an existing rule set. At least some rule sets may be shared, with consent of a creating party, to enable other users to leverage existing rule sets. A learning algorithm may be trained and deployed to suggest rule sets to users, and may update a suggestion model in response to selections and/or edits by a user. In some embodiments, the learning algorithm may be used to inform creation of the rule sets.

The service provider may generate scores to indicate conformity between a rule set and an outcome of the rule set (e.g., the selection of the physical locations). For example, a first variance score may be determined based on currently selected physical data service locations and an output of a location determination rule set at a first time. At a second time after the first time, the rule set may be used to determine different physical data service locations, presumably after new data centers and/or resources are deployed and attributes of the data centers change. A second variance score may be determined based on newly selected physical data service locations and an output of a location determination rule set at a second time. The scores, or a difference in the first and second variance scores, may be communicated to the user and/or may be used to inform decisions about deployment of new physical locations and/or data migration to different physical locations. For example, a message may be generated to inform a user of opportunities to increase conformity with the given parameters, possibly with metrics showing the resulting change (e.g., change in latency, change in cost, etc.).

In some embodiments, the service provider may add a location and/or determine where to add capacity based on the rule set and/or other information. For example, the service provider may select, at a time after a change in at least one of cost or latency associated with physical data service locations, one or more different physical data service locations using the rule set. The service provider may then 1) initiate use of the one or more different physical data service locations, or 2) migrate at least one of computing service or data storage service from a first location of the one or more physical data service locations to a second location of the one or more different physical data service locations.

Ultimately, as the collection of data centers continues to grow and and/or evolve, these changes may result in different selections by deploying established rule sets. In various embodiments, the service provider may use the parameter information and/or the rule sets to determine where to build and/or deploy new computing resources and/or expand current data centers, such as to optimize physical location of the computing resources based on cost tolerance and/or latency tolerance, among other possible factors.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the examples described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific examples or examples. The drawings herein are not drawn to scale. Like numerals represent like elements throughout the several figures (which may be referred to herein as a "FIG." or "FIGS.").

FIG. 1 is a schematic diagram of an illustrative environment 100 that includes a service provider 102 to assist users in selecting physical locations to deploy computing resources. The service provider 102 may be in communication with a service provider network 104 that includes various data centers 106(1)-(N), each having a physical location and attributes 108(1)-(N). The attributes may include an address for computing resources, a physical location, a computing resource type, and/or other attributes of the computing resources. One or more network(s) 110 may facilitate communications between the various computing resources and the service provider 102. The service provider network 104 may span a region, a country, or multiple countries. Examples described herein show the service provider network 104 as spanning at least a portion of the United States of America; however, the service provider network 104 may span more or less area, including other countries, territories, and/or areas populated by people. Additional information about the configuration of the service provider network 104 and the data centers 106 is described with reference to FIGS. 10 and 11.

As shown in FIG. 1, a user 112 associated with a user device 114 may communicate with the service provider 102 to set up or define information associated with computing resources used by or deployed on behalf of the user 112. For example, the user 112 may desire computing resources for data storage, compute services, streaming services, and/or other computing services. The user 112 may specify services and then provide information, via the user device 114, to the service provider 102 to physically locate data, compute services, or other computing resources in the service provider network 104.

The service provider 102 may communicate with other entities 116(1)-(M), which may be users, companies, and/or other types of entities that utilize computing resources. Some of the entities 116 may be sophisticated entities that desire to control rule sets that are used to select physical locations of computing resources, such as technologies companies the deploy large and/or many instances to provide data to end users, such as consumers of streaming media. Some of the rule sets used by the entities may be approved for use by other entities/users (after consent by a creator), which may be used to create a library of rule sets. As discussed below, advanced entities/users may utilize shared rule sets, which may be recommended based on a learning model as described below.

The service provider 102, meanwhile, may deploy various components, such as a user interface component 118, a parameter tool 120, and a data location selection component 122, among other possible components, to provide services for the user 112 and/or the entities 116. Other components may be used by the service provider, as described with reference to FIG. 2. An example usage scenario is presented to explain use of these components in a simplified framework. The user interface component 118 may serve a UI to the user device 114, which may be presented in the interface 124. The user interface component 118 may include selectors and/or controls that enable user manipulation to provide information used to create a rule set that selects physical locations of computing resources on behalf of the user. After user interaction with the interface 124, the parameter tool 120 may receive information about parameters specified by the user 112, via the user device 114. For example, the parameters may include a cost tolerance (e.g., cost guidelines specified by the user, possibly relative and ranging from cheaper to more expensive options, etc.), a latency tolerance (e.g., data transmission delay to end users, which may or may not include internal data center latency, etc.), fault tolerance (e.g., data redundancy, etc.), data compliance requirements (e.g., data sovereignty), and/or other parameters. In some embodiments, the parameters may include actual or anticipated locations of end-users. The end-user information may be submitted via the user interface by manipulating a map or other graphic, uploading data (e.g., a database), and/or by other similar techniques. The parameter tool 120 may use the received parameters and possibly other information to assist in creating a location determination rule set (or simply "rule set"). The other information may include relationships between computing resources deployed on behalf of the user, such as relationships between compute services and data storage services, which may benefit from a close proximity to one another depending on dependencies and system performance, and possibly other factors.

The data location selection component 122 may use the rule set to select and/or deploy computing resources at one or more physical locations based on information received from the user device by the parameter tool 120. For example, a customer may desire low latency tolerance, high cost tolerance, and location of end-users in California and in southeastern states. Based on the parameters, the data location selection component 122 may select a single physical location of an established data center to service all end-users or may select multiple physical locations of established data centers to service end-users in respective regions (e.g., one near San Francisco, one near Atlanta, etc.).

Figure 2:
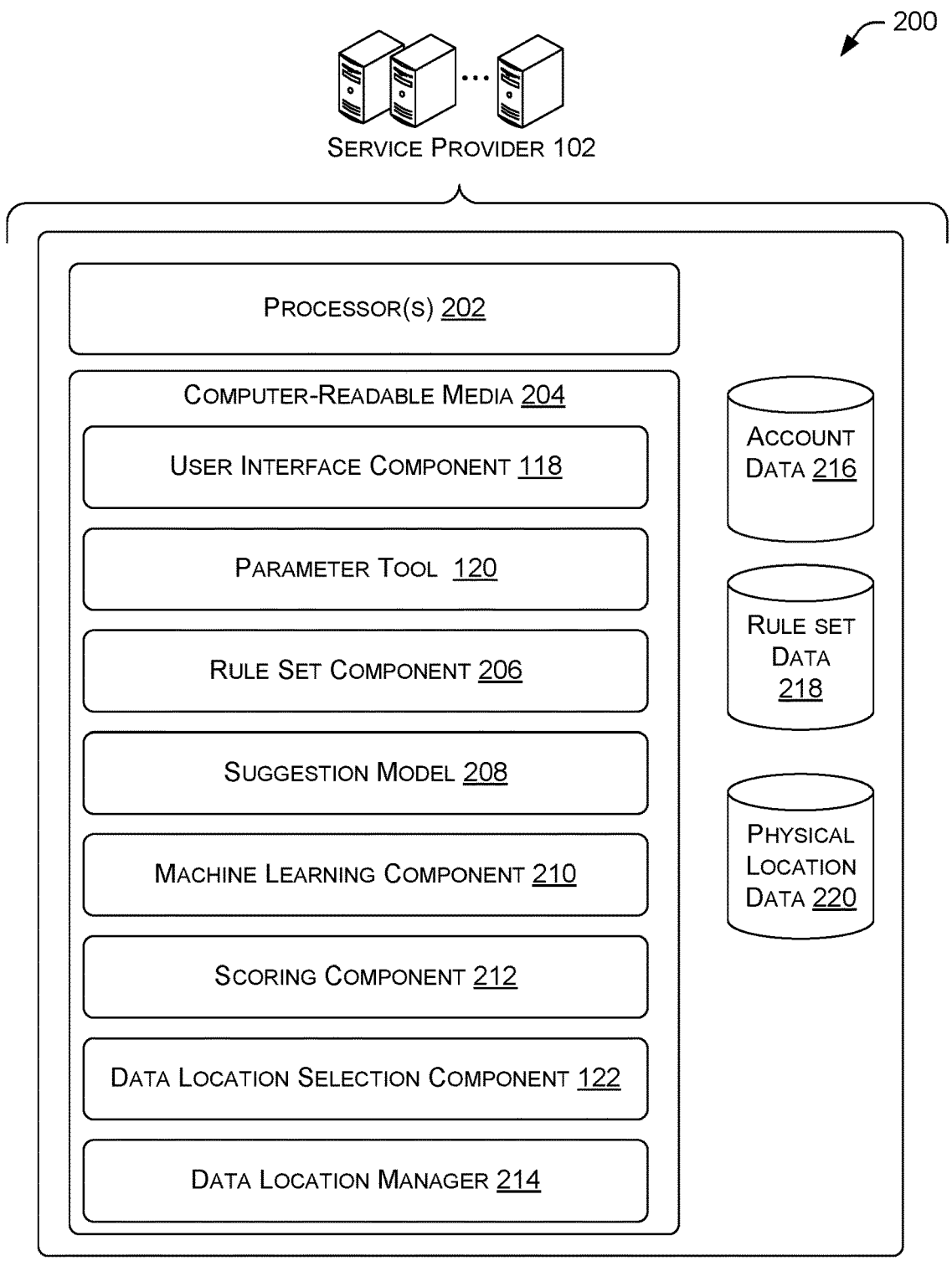
FIG. 2 is a schematic diagram of an illustrative computing architecture of the service provider shown in FIG. 1.

FIG. 2 is a schematic diagram of an illustrative computing architecture 200 of the service provider shown in FIG. 1. The computing architecture 200 may be implemented in a distributed or non-distributed computing environment. The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store the user interface component 118, the parameter tool 120, a rule set component 206, a suggestion model 208, a machine learning component 210, a scoring component 212, the data location selection component 122, and/or a data location manager 214, which are described in turn. The components may be stored together or in a distributed arrangement. The service provider 102 may also access data including account data 216, rule set data 218, and physical location data 220, which may include the attributes 108 discussed with reference to FIG. 1.

The user interface component 118 may serve a user interface to a user device to collect information from the user to inform selection of physical locations of existing computer resources. The user interface component 118 may include selectors and/or controls that enable user manipulation to provide information used to create a rule set that selects physical locations of existing computing resources on behalf of the user. In various embodiments, the user interface component 118 may enable users having different levels of sophistication to provide different amounts of information to inform a selection. For example, the user interface component 118 may enable unsophisticated users to authorize the service provider 102 to make the selection on behalf of the user with little or no inputs from the user. The user interface component 118 may enable some users to submit parameters, such as using the aforementioned selectors and/or controls, to provide basic parameters to the service provider to make the selection on behalf of the user. The user interface component 118 may enable sophisticated users to submit detailed information and/or edits to rule sets to provide advanced parameters and/or rule sets to the service provider to make the selection of the physical locations of existing computing resources.

The parameter tool 120 may receive parameters specified by the user via the user device. Example parameters may include a cost tolerance, a latency tolerance, fault tolerance, data compliance requirements, and/or other parameters. In some embodiments, the parameters may include actual or anticipated locations of end-users. The end-user information may be submitted via the user interface by manipulating a map or other graphic, uploading data (e.g., a database), and/or by other similar techniques. The parameter tool 120 may use the received parameters and possibly other information to assist in creating a rule set. The other information may include relationships between computing resources deployed on behalf of the user, such as relationships between compute services and data storage services, which may benefit from a close proximity to one another depending on dependencies and system performance, and possibly other factors. For example, the parameter tool 120 may leverage account data 216 that include services obtained to expected to be obtained by a user, along with other possible information.

The rule set component 206 may create rule sets based on at least the parameter information received by the parameter tool 120. In some embodiments, the rule set (or "location determination rule set") may include weights based on input received by the parameter tool 120. The rule set component 206 may determine a quantity of physical locations for existing computing resources. However, the quantity of physical locations may be specified by a user in some embodiments, such as via the user interface. The rule set may be used to cause selection of the physical locations as discussed below, and/or may be used to update selection, add new physical locations, and/or provide a message to a user to inform the user of possibly optimizations. The rule set component 206 may provide multiple rule sets, which may be provided to the user for selection and/or to enable selection of different physical locations. The rule sets may be stored in the rule set data 218 and may be shared, when consent is provided by a party that creates the rule set. Sharing rule sets may enable users to leverage prior rule sets and/or customized rule sets that may assist a user with specific needs. Below, some example generic rule sets follow.

Example Rule set 1: minimize(latency_ms(resource, Tacoma)),

Example Rule set 2: minimize(0.1*latency_ms(resource, Tacoma)+0.5*transfer_usd_per_gb(resource, Vancouver)+ 5.0*transfer_usd_per_gb(resource, database)).

The suggestion model 208 may recommend shared rule sets to users, such as rule sets stored in the rule set data 218. The rule set component 206 may enable users to edit rule sets (including shared rule sets) to customize the rule sets for specific purposes. For example, a location may be changed in a rule set, while maintaining other parameters. As discussed below, the suggestion model 208 may be created by or work in conjunction with the machine learning component 210.

The machine learning component 210 may be trained using parameter data and location data to create rule sets and/or to assist in selecting shared rule sets from the rule set data, possibly by building or maintaining the suggestion model 208. For example, the machine learning component 210 may be trained using sample data and/or actual data to continually improve creation and/or selection of rule sets. In some embodiments, the machine learning component 210 may create and/or update the suggestion model 208. In various embodiments, the machine learning component 210 may be trained using training data, configured to generate the location determination rule set, and then retrained or updated after receipt of a selection change to at least one location of the one or more physical data service locations. The machine learning component 210 may be updated based on the selection change, edits to rule sets, and/or based on other received user interactions that indicate preferences of users in association with inputs (e.g., parameters, etc.). Additional details about the machine learning component 210 are described with reference to FIG. 6 below.

The scoring component 212 may determine scores to indicate conformity between a rule set and an outcome of the rule set. For example, a first variance score may be determined based on currently selected physical data service locations and an output of a location determination rule set at a first time. At a second time after the first time, the rule set may be used to determine different physical data service locations, presumably after new data centers and/or resources are deployed and attributes of the data centers change. A second variance score may be determined based on newly selected physical data service locations and an output of a location determination rule set at a second time. The scores, or a difference in the first and second variance scores, may be communicated to the user and/or may be used to inform decisions about deployment of new physical locations and/or data migration to different physical locations. For example, a message may be generated to inform a user of opportunities to increase conformity with the given parameters, possibly with metrics showing the resulting change (e.g., change in latency, change in cost, etc.). The scoring component 212 may be executed at different times to determine the different scores.

The data location selection component 122 may use the rule set to select and/or deploy computing resources at one or more existing physical locations using the physical location data 220, which may indicate physical locations, available of computing resources, cost data and/or latency data associated with physical locations. For example, cost data may include service provider costs, inter-network transfer costs, inter-region data transfer costs, and/or network transmission costs. Latency data may include metrics associated with latency to an end-user, and may also include inter-network latency or other subdivisions of latency between nodes. The location selection component may use a rule set at different times, and may receive different results based on when the rule set is used due to changes in costs, latency, availability, and/or other factors.

The data location manager 214 may manage use of computing resources at the data centers and/or may populate the physical location data 220. In some embodiments, the data location manager 214 may cause deployment of a selection of physical locations for a user based on an output of the data location selection component. In various embodiments, the data location manager may make changes to capacity of existing resources and/or add resources, possibly at different physical locations, such as to create an elastic computing resource. The data location manager 214 may employ the rule set to determine where to make capacity changes to existing computing resources, and/or where to add new physical locations. Such changes may be made using a preauthorization by the user or made after an authorization or confirmation from the user. As an example, the data location manager 214 may initiate use of the one or more different physical data service locations for at least one of additional computing services or additional data storage services and/or migrate at least one of the computing services or the data storage services from a first location of the one or more physical data service locations to a second location of the one or more different physical data service locations.

Additional information about the operation of service provider 102 is discussed below by way of flow diagrams. The flow diagrams include blocks that may be performed by the various components discussed above, and possibly by other similar types of components.

FIGS. 3-6 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly.

Figure 3:
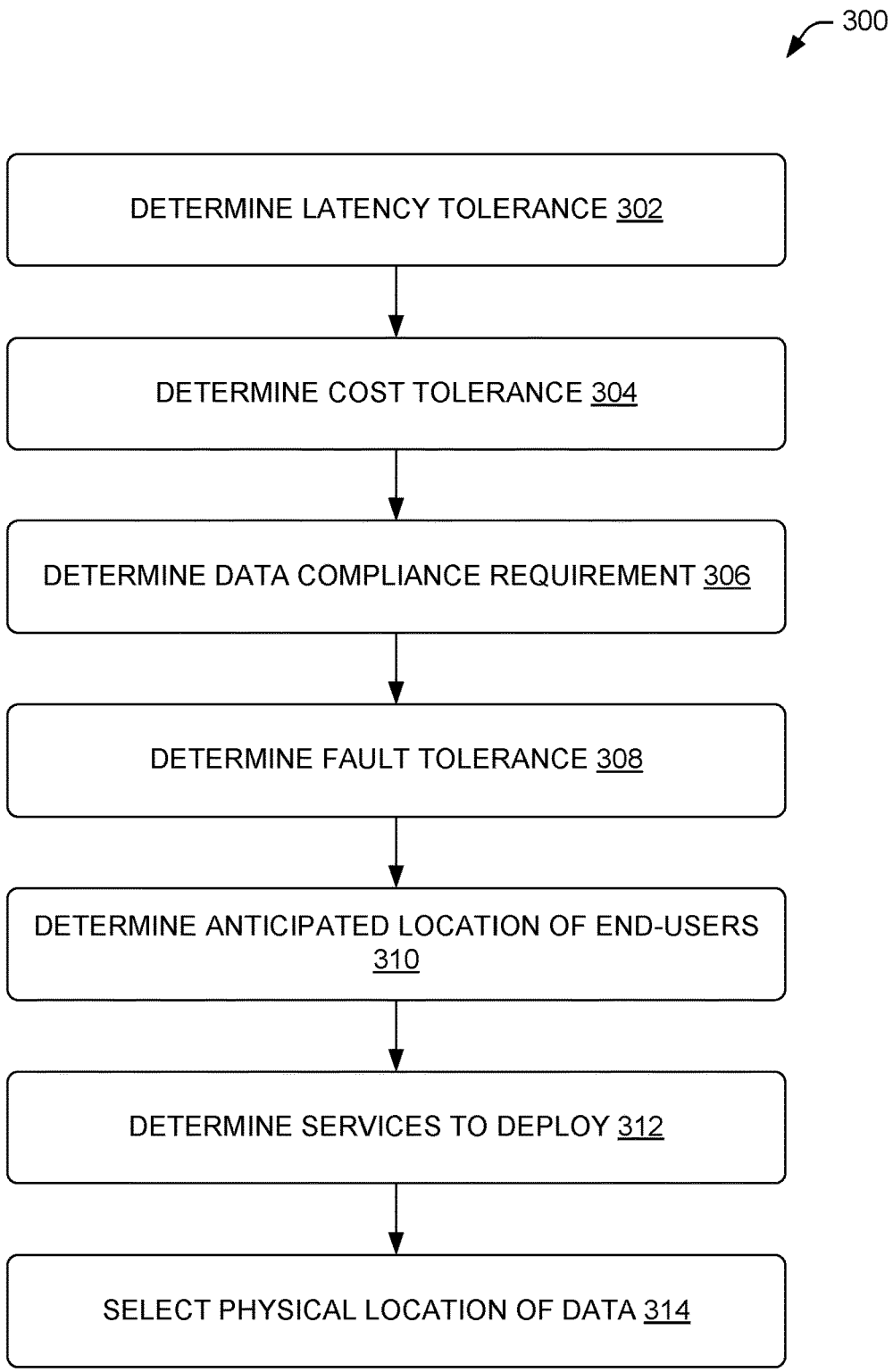
FIG. 3 is a flow diagram of an illustrative process to collect parameters to build a rule set for selecting physical locations to deploy computing resources.

FIG. 3 is a flow diagram of an illustrative process 300 to collect parameters to build a rule set for selecting physical locations to deploy computing resources. The process 300 is described with reference to the environment 100 and the computing architecture 200. Of course, the process 300 may be performed in other similar and/or different environments.

At 302, the service provider 102 may determine a latency tolerance. The latency tolerance may be received as a latency value based on user input to a user interface provided by the user interface component 118. In some embodiments, the user interface may include a latency control or latency selector, which may be manipulated by users to specify a relative importance of latency, possibly in view of other factors, such as cost. Latency may include latency to an end-user, and may also include inter-network latency or other subdivisions of latency between nodes. The parameter tool 120 may receive the latency value.

At 304, the service provider 102 may determine a cost tolerance. The cost tolerance may be received as a cost value based on user input to a user interface provided by the user interface component 118. In some embodiments, the user interface may include a cost control or cost selector, which may be manipulated by users to specify a relative importance of cost, possibly in view of other factors, such as latency. Cost may include service provider costs, inter-network transfer costs, inter-region data transfer costs, and/or network transmission costs. The parameter tool 120 may receive the cost value.

At 306, the service provider 102 may determine a data compliance requirement. The data compliance requirement may be received as a data compliance information based on user input to a user interface provided by the user interface component 118. In some embodiments, the user interface may include a data compliance requirement input control, which may be manipulated by users to specify data compliance or sovereignty requirements. For example, a user may have data sovereignty requirements imposed by countries where data resides, which may be specified by a user. However, users may desire to satisfy various data compliance standards, different than data sovereignty requirements. For example, additional compliance codes may require that an area infrastructure comply with additional government regulations and compliance frameworks, such as IRAP, ITAR, PCI-DSS, and FedRAMP.

In various embodiments, the service provider may alert a user if parameters input by the user are likely to prompt use of data compliance requirements, such as when the user specifies a location of end-users in a country that includes laws for data sovereignty. The parameter tool 120 may receive the data compliance information.

At 308, the service provider 102 may determine a fault tolerance. The fault tolerance may be received as a fault tolerance selection based on user input to a user interface provided by the user interface component 118. The fault tolerance may specify implementation of data redundancy of the one or more computing resources. The fault tolerance selection may be used to determine one or more physical data service locations for computing services to satisfy at least a desired service level specified by the user and also the fault tolerance selection. The parameter tool 120 may receive the fault tolerance selection.

At 310, the service provider 102 may determine actual or anticipated locations of end-users. In some embodiments, the user interface may receive location information, such as by upload of a database, manipulation of a map, and/or by other inputs of data. The locations of end-end users may be estimates, which may be received as course data identifying primary locations of anticipated end users. The parameter tool 120 may receive the anticipated locations data.

In various embodiments, some but not all of the operations 302-310 may be used to collect parameters. For example, in various embodiments, one or more of the operations 302-310 will be omitted, and thus the corresponding data may not be used in those embodiments to inform other operations in this process 300. In accordance with at least one embodiment, the parameter tool 120 may determine other parameters without input by users, such as relationship dependencies between services, information from the account data 216, and/or other information that may be used to determine physical locations for computing resources.

At 312, the service provider 102 may determine services to deploy for the user. For example, the user may elect to deploy compute services, streaming services, data storage services, and/or other types of services provided by the service provider network 104. Some services may only be available by certain data centers, which may influence selection of the data centers, and thus the selection of physical locations of the computing resources.

At 314, the service provider may select one or more physical locations for computing resources based on data stored by the parameter tool 120 (via one or more of the operations 302-310) and services requested by the user via the operation 312. In various embodiments, the information collected from one or more of the operations 302-310 via the parameter tool 120 may be used by the rule set component 206 to build a location determination rule set. The location determination rule set may then be used to select the one or more physical locations of the computing resources. In some embodiments, the location determination rule set may determine a quantity of the physical locations, which may be based on multiple factors such as the locations of end-users, the types of resources requested per the operation 312, received user input, and/or other possible factors.

Figure 4:
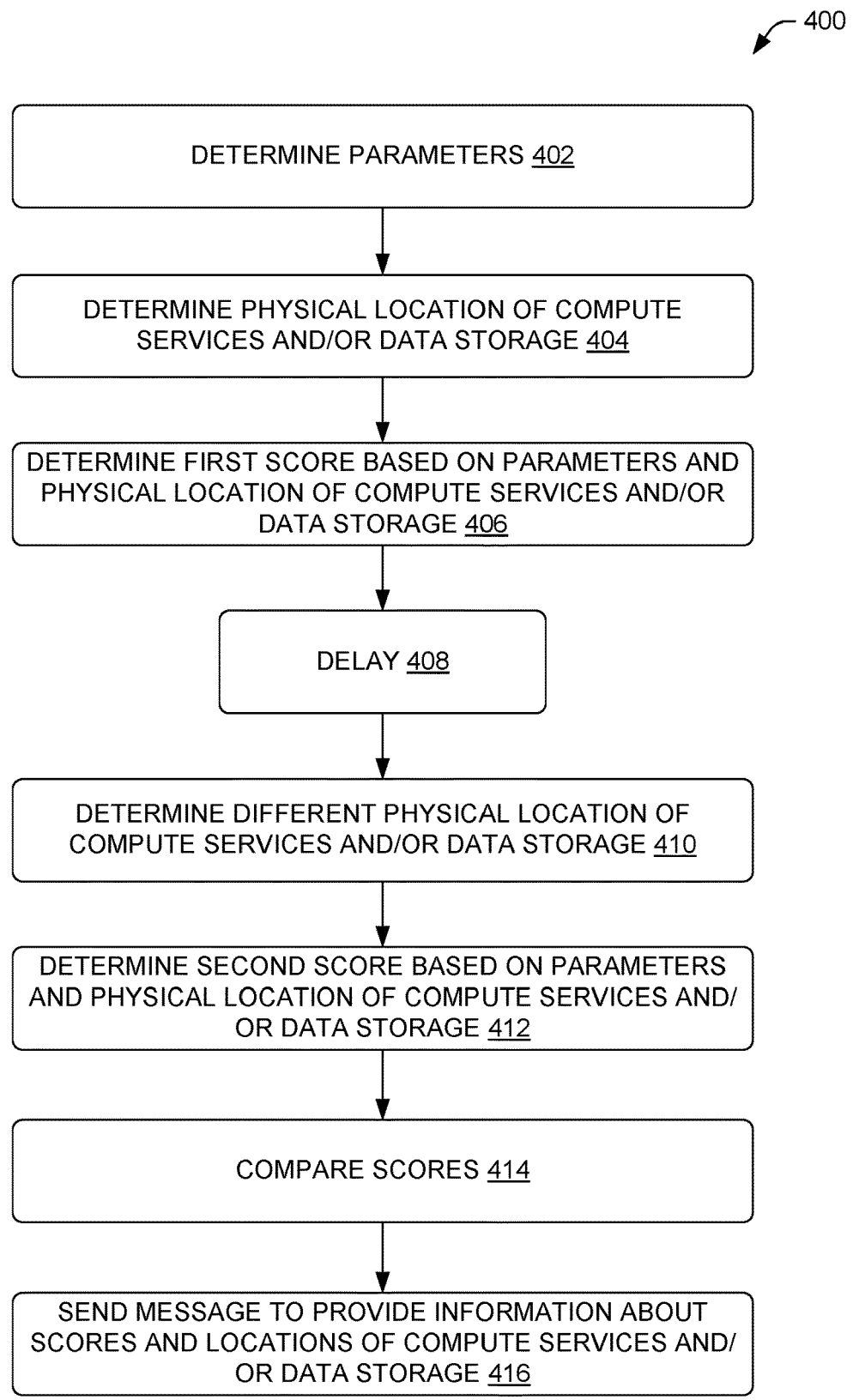
FIG. 4 is a flow diagram of an illustrative process to determine scores associated with rule sets and selections of physical locations to deploy computing resources, which may be used to inform future expansion and/or migration decisions.

FIG. 4 is a flow diagram of an illustrative process 400 to determine scores associated with rule sets and selections of physical locations to deploy computing resources, which may be used to inform future expansion and/or migration decisions. The process 400 is described with reference to the environment 100 and the computing architecture 200. Of course, the process 400 may be performed in other similar and/or different environments.

At 402, the service provider 102 may determine parameters as received by the parameter tool 120. For example, the parameters may include data received from at least some of the operations 302-310 described above with reference to FIG. 3. The parameters may be received by the parameter tool 120.

At 404, the one or more physical locations of the computing resources may be determined at a first time. The operation 404 may utilize information about computing resources requested by the user, such as the information obtained by the operation 312 discussed with reference to FIG. 3. The operation 404 may be performed similar to the operation 314 discussed with reference to FIG. 3.

At 406, the service provider 102 may determine a first score based on the parameters from the operation 402 and the selected physical locations from the operation 404. The score may indicate a conformity of the physical locations to the parameters. For example, the score may be a percent or value (e.g., 1-10, 1-100). In some embodiments, the scoring component 212 may determine a first score based on the one or more physical data service locations and an output of the location determination rule set at or near the first time, where the location determination rule set utilizes the parameters from the operation 402.

At 408, a delay be occur, such as a delay of time between the first time and a second time. During the delay, attributes of the data centers may change, new data centers may open, some data centers may close, and/or other changes to the service provider network 104 may take place. The delay may be random, a predetermined delay or terminated based on action by a user or other device or entity.

At 410, the one or more different physical locations of the computing resources may be determined using the location determination rule set, and the new attributes of the service provider network 104, at the second time. The operation 404 may utilize information about computing resources requested by the user, such as the information obtained by the operation 312 discussed with reference to FIG. 3. The operation 410 may be performed similar to the operation

404, but with a different attributes of the service provider network 104 resulting from the delay at the operation 408.

At 412, the service provider 102 may determine a second score based on the parameters from the operation 402 and the selected physical locations from the operation 410. For example, the scoring component 212 may determine a second score based on the one or more different physical data service locations and an output of the location determination rule set at a first time, where the location determination rule set utilizes the parameters from the operation 402.

At 414, the service provider 102 may compare the first score and the second score, via the scoring component 212. In some embodiments, when the second score is higher or otherwise indicative of better conformance to the parameters than the first score, possibly by a threshold amount, then the service provider 102 may take further actions.

At 416, the service provider 102 may send a message to the user or other entity or representative to provide information about the scores and other possible physical locations of the computing resources. For example, the service provider 102 may provide the message when the different between the scores is greater than or equal to a threshold amount. The threshold amount may be a difference in score, a different in latency, a difference in cost, or a combination of one or more of the difference in score, the difference in latency, or the difference in cost. In some embodiments, the service provider 102 may make changes to the physical locations, such as by adding a physical location. The changes may be approved by the user prior to making the change, possibly via an authorization well in advance of the change, such as when or around the time the user initially entered the parameters at the operation 402. Changes may include migration of data to another location, initiating use of another location, adding capacity to existing locations (e.g. elastic capacity), balancing capacity between various locations, and/or other changes to optimize conformity to the parameters from the operation 402. Examples of changes are provided below with reference to FIG. 5. Of course, the user may update the parameters at a later time. In that case, the updated parameters may be used to drive decisions by the service provider 102.

In some embodiments, updated information about end-user locations may be used in the operations 410 and/or 412, which may influence a change in the score, particularly when the end-user location is significantly different than the anticipated end-user locations possibly used to determine the physical locations at the operation 404.

In various embodiments, the physical locations from the operation 404 may be compared to the different physical locations from the operation 410 to determine a change or to determine a variance. This information may be reported via the operation 416 in lieu of the scores, or with the scores.

Figure 5:
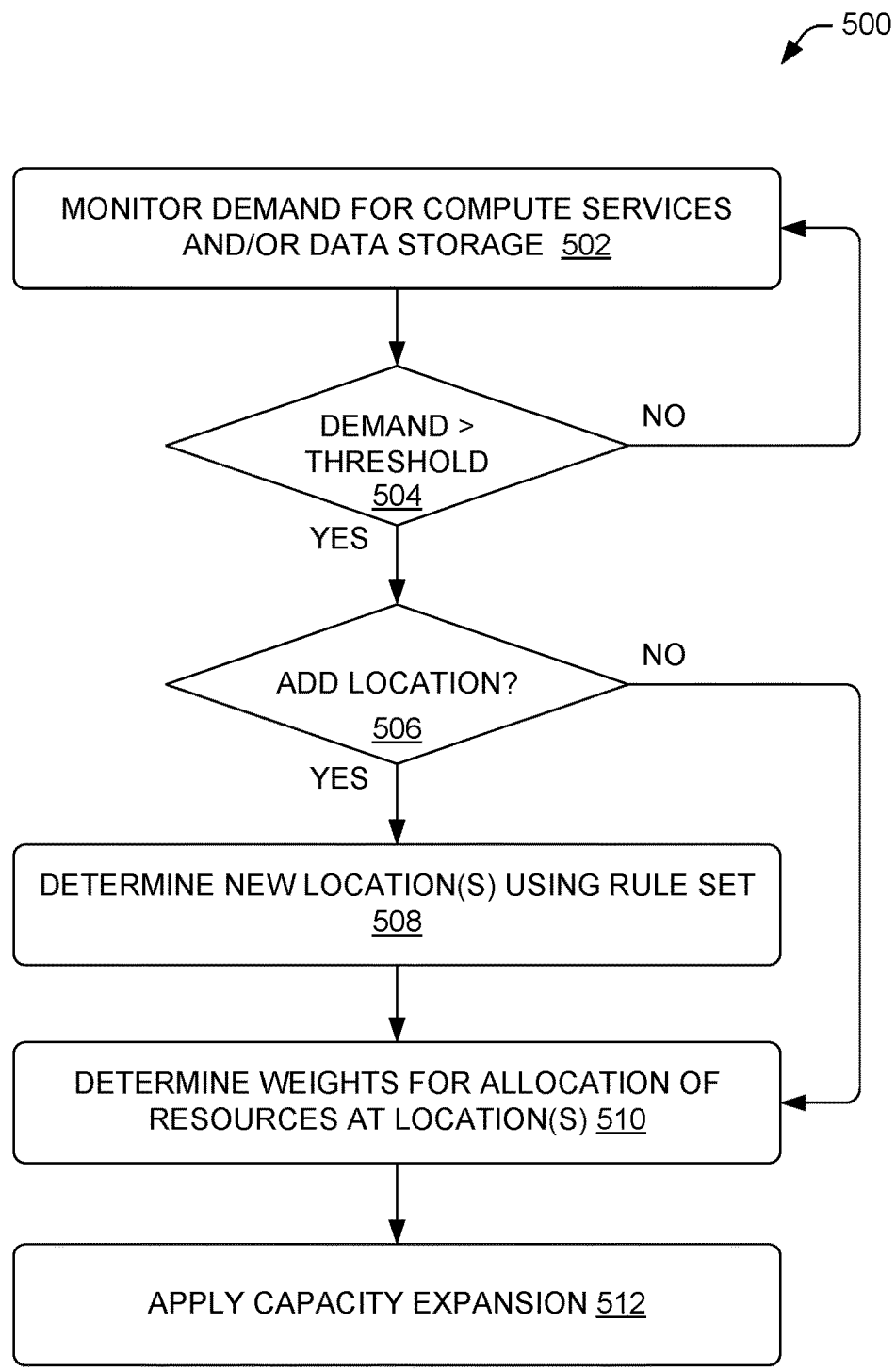
FIG. 5 is a flow diagram of an illustrative process to add more computing resources and/or capacity to an existing computing resource allocation.

FIG. 5 is a flow diagram of an illustrative process 500 to add more computing resources and/or capacity to an existing computing resource allocation. The process 500 is described with reference to the environment 100 and the computing architecture 200. Of course, the process 500 may be performed in other similar and/or different environments.

At 502, the service provider 102 may monitor demand for computing resources. For example, the service provider may determine if additional capacity can be added to current computing resources (e.g., elastic capacity), and/or whether new physical locations can be added based on changes in demand. In some embodiments, the change in depend may be based on changes in locations of end-users, or concentrations of end users. For example, if a user initiates a service that becomes more popular and transition from a regional service (e.g., West Coast) to a national level service (e.g., spanning most of the United States of America), then it may be prudent to add new physical locations to better serve East Coast end-users and possibly other end users. The demand may be expressed as a value. In some embodiments, the demand may be a variance in the scores, discussed above, which may prompt a change in the physical locations or allocations in existing physical locations previously selected by the service provider for the user.

At 504, the service provider 102 may compare the demand (or score, etc.) to a threshold value. When the demand is less than the threshold (following the "no" route from the decision operation 504), then the process 500 may advance to the operation 502 and continue monitoring. When the demand is greater than or equal to the threshold (following the "yes" route from the decision operation 504), then the process 500 may advance to the decision operation 506.

At 506, the service provider 102 may determine whether to add a new physical location for the computing resources. For example, the user interface provided by the user interface component 118 may receive approval from the user to add physical locations to add capacity to computing resources in compliance with the rule set created for the user, as discussed above. In some embodiments, the service provider 102 may seek authorization from the user or another representative before adding a new existing physical location for computing resources. When a new location can be added (following the "yes" route from the decision operation 506), then the process 500 may advance to an operation 508.

At 508, the service provider 102 may determine one or more different existing physical locations to deploy computing resources on behalf of the user. The different physical locations may be determined by using the rule set, which may use the parameters received, and may possibly be updated with current information about end-users, and/or other information.

Following the operation 508, or when a new location is not to be added (following the "no" route from the decision operation 506), following the decision operation 506, the process 500 may advance to an operation 510. At 510, the service provider 102 may determine weights or other allocation factors to distribute computing resources across the selected physical locations and any additional different physical locations (via the operation 508, if applicable). In some embodiments, the weights/allocation may be determined by applying the rule set or elastic capacity algorithms to determine optimized or advantageous allocation of resources based on the parameters, location of end-users, current attributes of the data centers (e.g., costs, latency, etc.), and/or other relevant information.

At 512, the service provider 512 may initiate the capacity expansion using the weights/allocation provided by the operation 510. For example, the data location manager 214 may deploy a different computing resource at a different physical location, add capacity to an existing computing resources at one or more of the selected physical locations, migrate data, terminate use of a prior used computing resource at one or more of the selected physical locations, and/or make other changes in accordance with the information described above.

Figure 6:
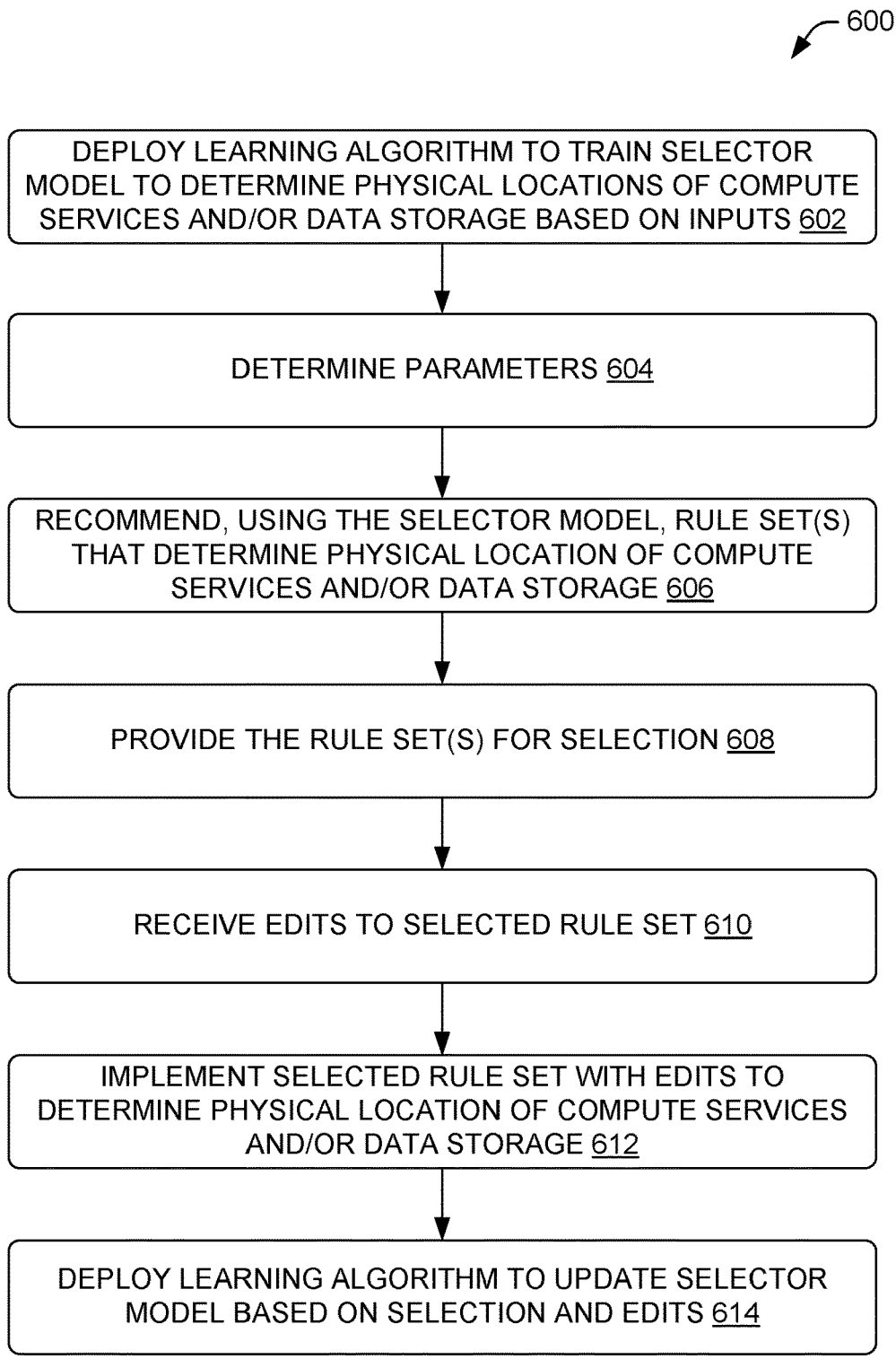
FIG. 6 is a flow diagram of an illustrative process to train and deploy a learning algorithm to build a selection model to suggest rule sets.

FIG. 6 is a flow diagram of an illustrative process 600 to train and deploy a learning algorithm to build a selection model to suggest rule sets. The process 600 is described with reference to the environment 100 and the computing architecture 200. Of course, the process 600 may be performed in other similar and/or different environments.

At 602, the service provider 102 may deploy a machine learning component 210 to train a selector model (e.g., learning model) to determine physical locations for computing resources based in inputs of various parameters. The training data may be parameters and/or other information received that indicates user preferences (e.g., parameters, etc.) and resulting rule sets. In some embodiments, the training data may include customized rule sets and/or shared rule sets that may include edits implemented based on received feedback from users. In various embodiments, the learning model may be trained to generate the location determination rule set.

At 604, the service provider may receive new parameters from a new user, which may be the same or different from the parameters described in the operations 302-310 with reference to FIG. 3. The new parameters may be used to locate a shared rule set for use by the user.

At 606, the service provider 102 may recommend rule sets, using the learning model, that determine the physical locations of the computing resources in accordance with the parameters. The rule sets may be shared rule sets that preexist, and may or may not include new rule sets generated from the parameters 604.

At 608, the service provider 102 may provide the rule sets to a user device via the user interface component 118. The user interface component 118 may receive a selection of one of the rule sets.

At 610, the service provider 102 may receive edits, modifications, and/or other changes to the selected rule set. For example, the rule set may include a location of "Tacoma", which may be changed to a location of "Seattle" based on input received from the user. Other changes may include changing parameter values, quantities of locations, and so forth.

At 612, the service provider 612 may implement the selected rule set with the edits (if edits are received), to determine one or more physical locations of the computing resources deployed on behalf of the user. The operation 612 may be the same or similar as the operation 314 described with reference to FIG. 3.

At 614, the machine learning component 210 may be deployed by the service provider 102 to update the leaning model (or selection model) based on the selection in response to the operation 608 and/or the edits received via the operation 610. The update may further train the learning model. In some embodiments, the updates may be performed as batch operations, and thus may not occur after each recommendation of a rule set.

Figure 7:
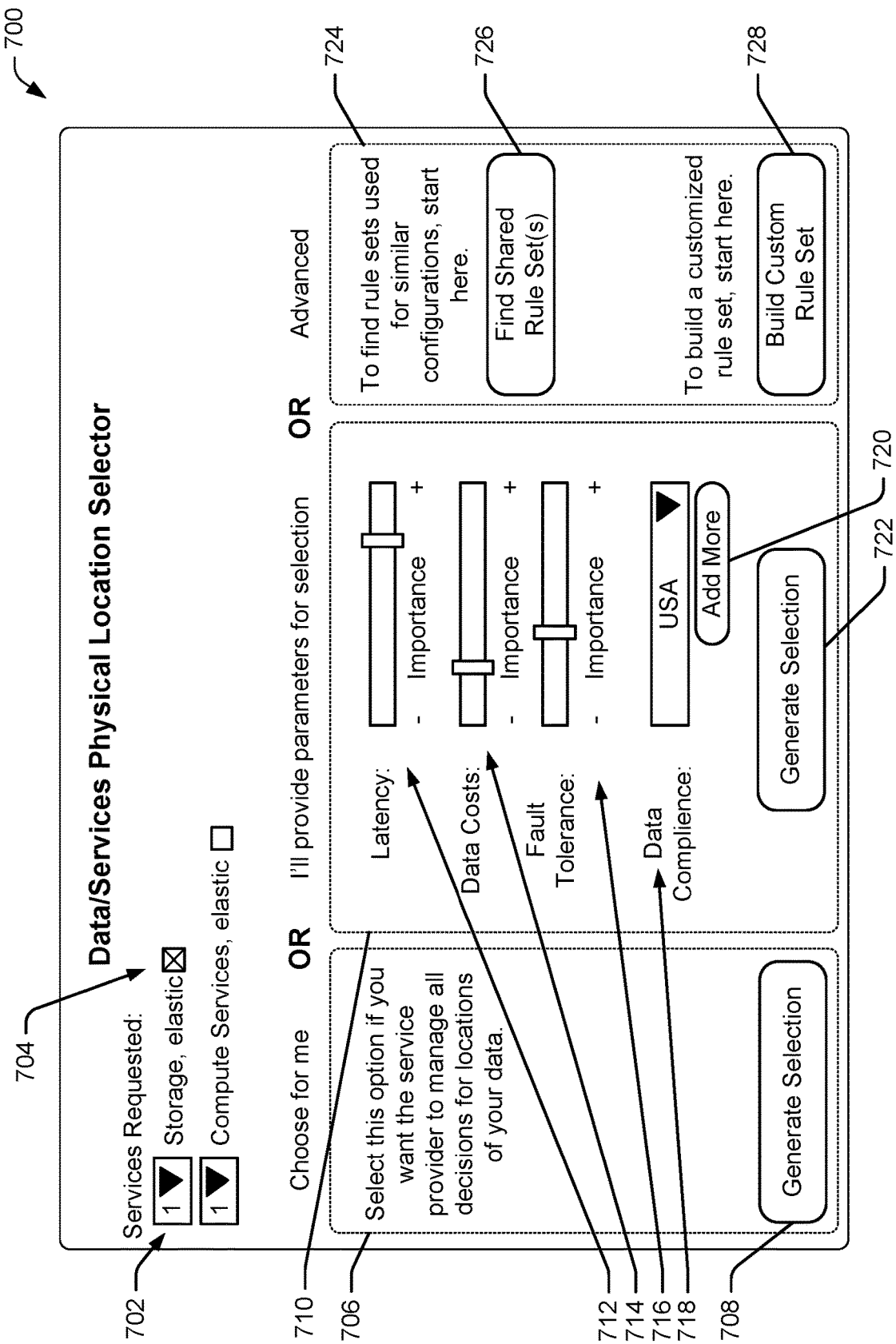
FIG. 7 is an illustrative user interface (UI) that includes a variety of selection options to allow unsophisticated and sophisticated users determine physical locations for computing resources.
Figure 8:
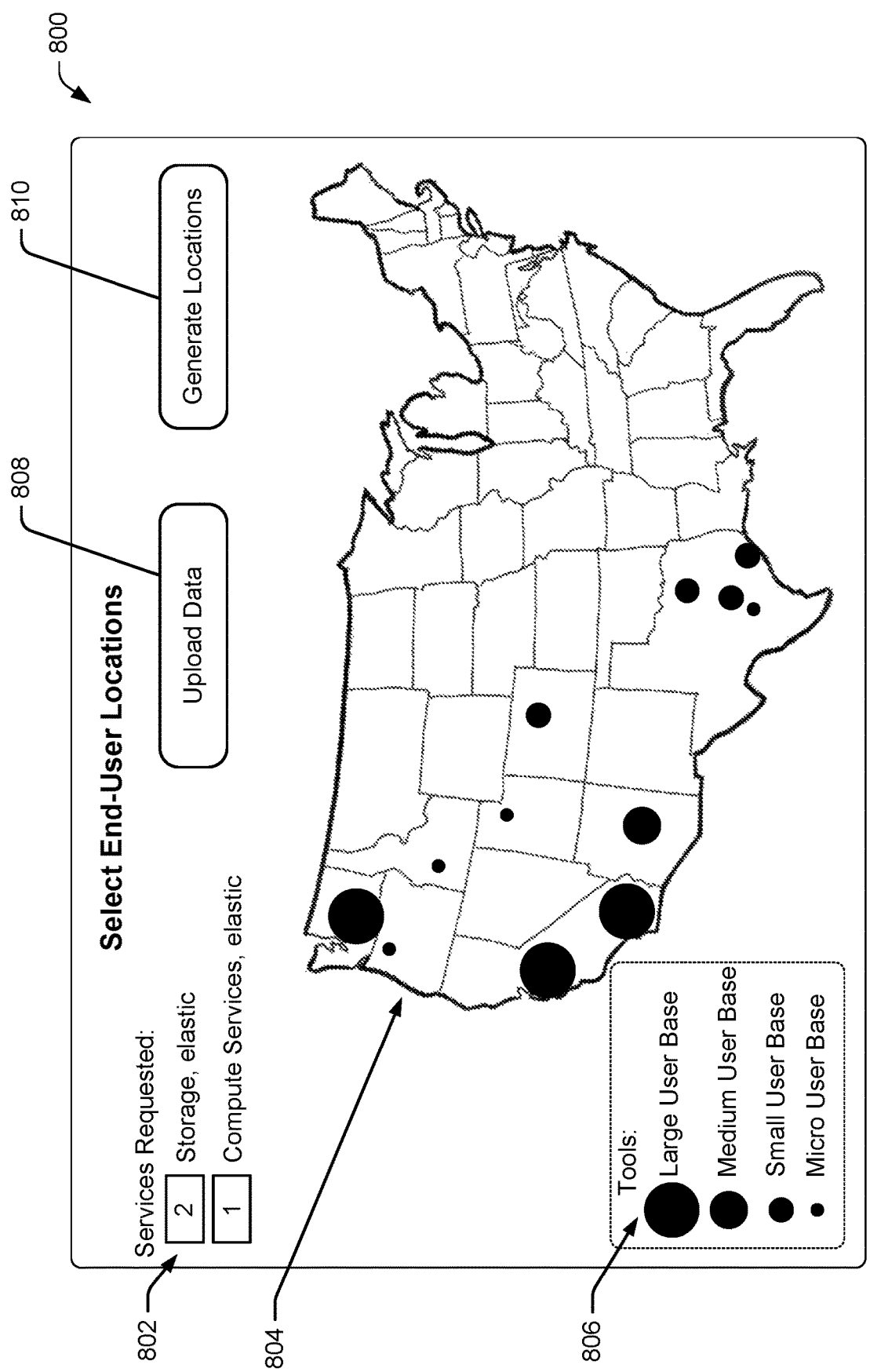
FIG. 8 is an illustrative UI that includes tools to enable a user to input actual or anticipated end-user locations for use by the rule set.
Figure 9:
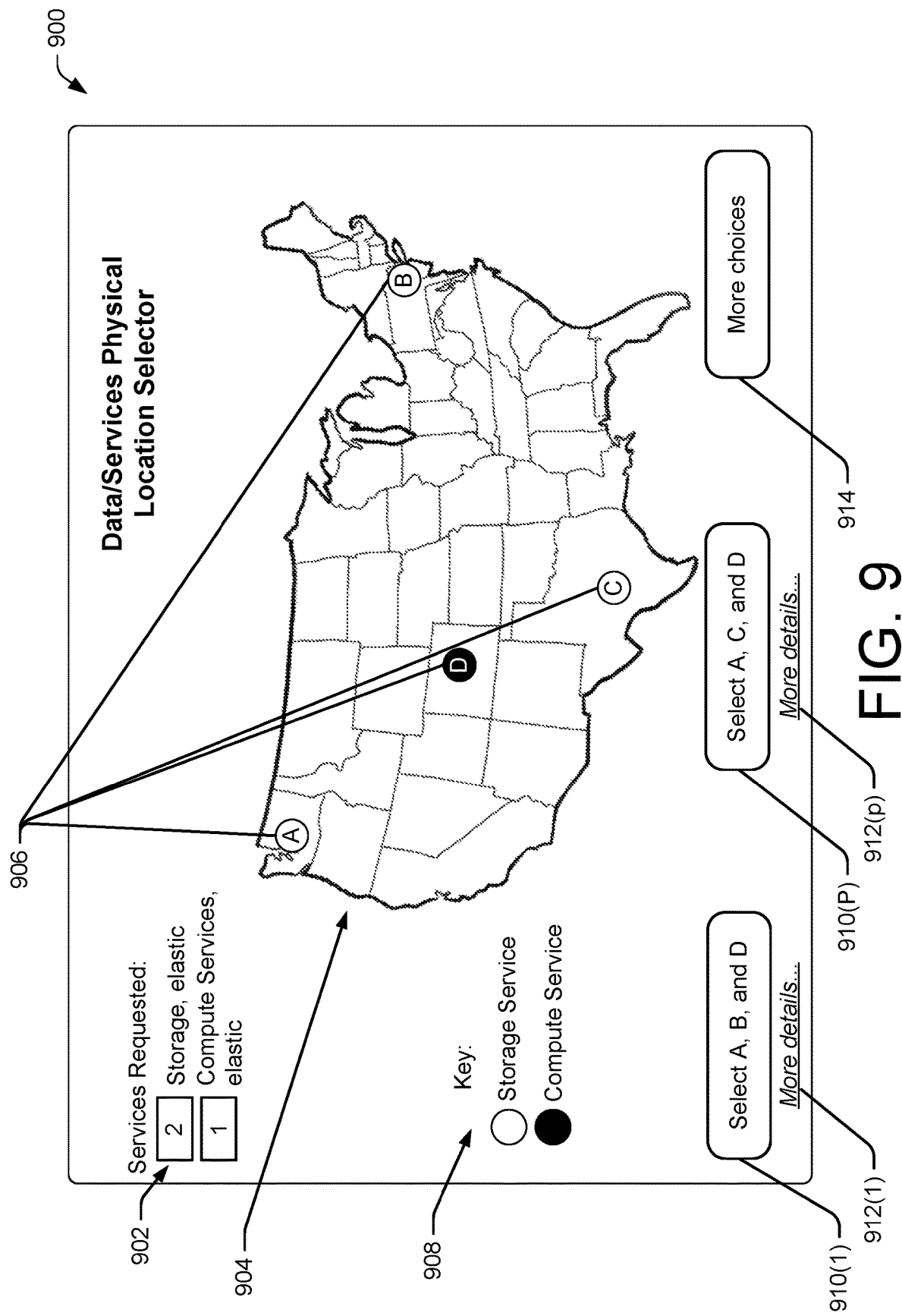
FIG. 9 is an illustrative UI that includes options for selection and deployment of physical locations for computing resources.

FIGS. 7-9 show illustrative user interfaces (UIs) that may be served to a user device and may enable submission of data, selections, and/or other information to the service provider. The UIs are examples, and may be presented in other graphical ways to collect the same or similar types of information.

FIG. 7 is an illustrative UI 700 that includes a variety of selection options to allow unsophisticated and sophisticated users determine physical locations for computing resources. The UI 700 may be used to input parameters, such as the parameters received via the operations 302-310 discussed with reference to FIG. 3.

In some embodiments, the UI 700 may include selectors 702 for different types of computing services. For example, the selectors 702 may include a quantity value. In some embodiments, the selectors 702 may be associated with an elastic control 704, which when selected, may instruct the service provider to add capacity possibly without further authorization by a user. Although the selectors 702 are shown with only two options (e.g., storage and compute services), other services may be offer, as well as different services altogether.

The UI 700 may include a first portion 706 to enable a user to select physical locations without further inputs by the user for deployment of the computing resources selected via the selectors 702. By selecting a first generate selection control 708, the service provider 102 may make decisions on behalf of the user, possibly leveraging any information about the user previously provided. For example, the service provider 102 may leverage data in the account data 216 pertaining to the user.

The UI 700 may include a second portion 710 to enable a user to select physical locations by specifying at least some parameters for deployment of the computing resources selected via the selectors 702. The second portion 710 may include a latency control 712, which may enable user manipulation to set a relative latency value (e.g. indication of relative importance). The second portion 710 may include a cost control 714, which may enable user manipulation to set a relative cost value (e.g. indication of relative importance). The second portion 710 may include a fault tolerance control 716, which may enable user manipulation to set a relative fault tolerance value (e.g. indication of relative importance, low/high selection, etc.). The second portion 710 may include a data compliance selector 718, which may enable user manipulation to set data compliance information, possibly for multiple locations or sovereignty rules, via an add more control 720. The second portion 710 may include other input controls and/or selectors. The controls may include sliders, drop down boxes, data entry fields, and/or other inputs, selectors, and/or controls to receive input, which is ultimately received by the parameter tool 120 and used as described above. Selection of a second generate selection control 722 may make decisions on behalf of the user, using the parameter information input via the second portion 710, possibly with any information about the user previously provided. The parameters may be used to generate the location determination rule set, as discussed above.

The UI 700 may include a third portion 724 to enable a user to leverage shared rule set(s), via a shared rule set control 726, and/or build a custom rule sets, via a custom rule set control 728, which may accommodate advanced users that desire to fine tune selection of physical locations. The shared rule set control 726 may invoke a process similar to or the same as the process 600 described with reference to FIG. 6. The custom rule set control 728 may enable a user to create a custom rule set, which may be created by specifying a rule set algorithm, selecting specific locations, and/or by other providing other manual inputs. In some embodiments, the controls in the third portion 724 may utilize information provided in the second portion 710, such as manipulation of controls to provide information for the parameter tool 120.

FIG. 8 is an illustrative UI 800 that includes tools to enable a user to input actual or anticipated end-user locations for use by the rule set. The UI 800 may be used in conjunction with the UI 700 described above. The UI 800 may include a computing resource indicator 802 that indicates the computing resources requested by a user. The UI 800 may include a graphical representation of map 804 of an area that includes data centers, such as an area associated with the service provider network 104. The map 804 may show a region, the entire United States of America, multiple counties, and/or any other area. The map 804 may or may not show general locations of the data centers. The map 804 may be used to indicate locations of actual or anticipated end-users of the computing resources. To populate the map, the UI may include tools 806, which may enable a user to manipulate the map, such as by dragging icons over the map 804, drawing boundaries on the map, selecting portions of the map 804, and/or by other input means. In some embodiments, an upload control 808 may enable a user to upload data regarding locations of end-users, such as from a database. Selection of a generate control 810 may cause the uploaded information may be reflected on the map 804, which may enable the user to further manipulate the map to edit information. When the user is satisfied with the representation of the end-users on the map, the user may select a submit control to submit the location information for use by the service provider. For example, the location information may be used by the operation 310 described above with reference to FIG. 3.

FIG. 9 is an illustrative UI 900 that includes options for selection and deployment of physical locations for computing resources. The UI 800 may be used in conjunction with the UI 700 and/or the UI 800 described above. The UI 900 may include a computing resource indicator 902 that indicates the computing resources requested by a user. The UI 900 may include a graphical representation of map 904 of an area that includes data centers, such as an area associated with the service provider network 104. The map 904 may show a region, the entire United States of America, multiple counties, and/or any other area. The map 904 may or may not show general locations of the data centers. The map 904 may be used to indicate selected physical locations 906 for the requested computing resources. A key 908 may indicate a type of physical location, such as types that associate with different types of selected computing resources (e.g., storage, compute services, etc.). In some embodiments, the map 904 may show a result of application of the location determination rule set. In various embodiments, the map 904 may show combinations of physical locations, where a combination may selected via location selectors 910(1)-910(P). For example, a first selector 910(1) may indicate a selectable combination of physical locations labels as "A, B, and D" whereas a different selector 910(P) may indicate a selectable combination of physical locations labels as "A, C, and D." More details controls 912(1)-912(P) may be associated with some of the location selectors. The more details controls 912(1)-912(P) may provide textual or other types of information to explain the selection of physical locations, such as an analysis of the parameters (e.g., cost, latency, data compliance and/or sovereignty, fault tolerance, etc.) used for a respective combination. A more choices control 914 may generate additional combinations and/or may enable a user to modify the rule set, parameters, and/or other data to generate different physical locations.

Figure 10:
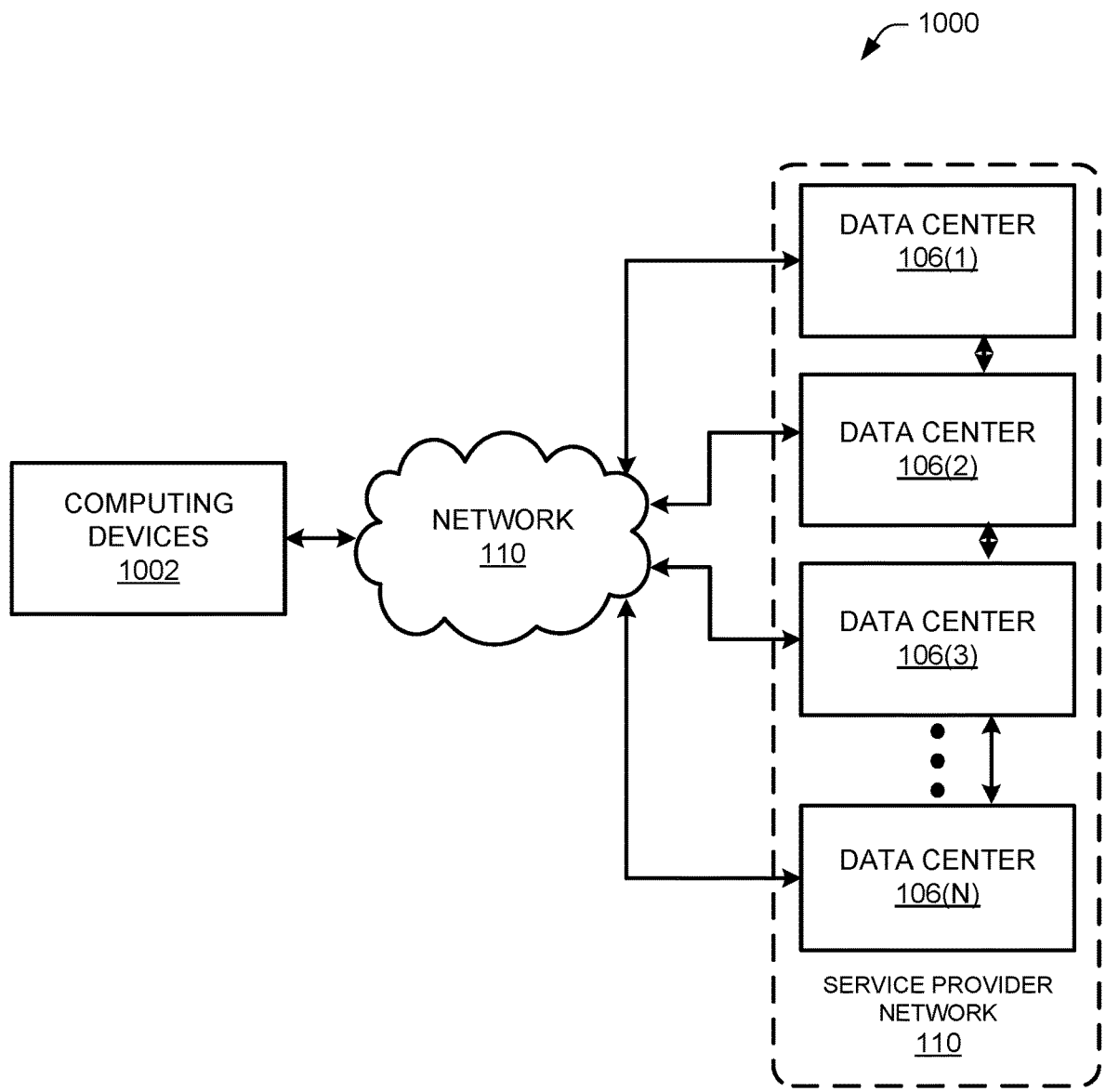
FIG. 10 is a block diagram that shows one illustrative operating environment for the examples disclosed herein that includes a service provider network.

FIG. 10 is a block diagram that shows an illustrative operating environment 1000 for the examples disclosed herein that includes a service provider network. FIG. 10 and the following description are intended to provide a brief, general description of a suitable computing environment in which the examples described herein may be implemented. In particular, FIG. 10 is a system and network diagram that shows an illustrative operating environment that includes a service provider network 104. As discussed above, service provider network 104 can provide virtual machine instances and computing resources on a permanent or an as-needed basis.

The computing resources provided by the service provider network 104 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by service provider network 104 are enabled in one implementation by one or more data centers 106(1)-106(N) (which may be referred to herein singularly as "a data center 106" or collectively as "the data centers 106"). The data centers 106 are facilities utilized to house and operate computer systems and associated components. The data centers 106 typically include redundant and backup power, communications, cooling and security systems. The data centers 106 might also be located in geographically disparate locations. One illustrative configuration for a data center 106 that implements some or all of the concepts and technologies disclosed herein will be described below with regard to FIG. 11.

The users and customers of service provider network 104 may access the computing resources provided by the data centers 106 over a suitable data communications network, such as a Wide Area Network ("WAN"), as illustrated by network 110. Although a WAN might be used, it should be appreciated that a local-area network ("LAN"), the Internet, or any other networking topology known in the art that connects the data centers 106 to the computing devices 1002 (such as the user device 114 shown in FIG. 1) may be utilized. It should also be appreciated that combinations of such networks might also be utilized.

Figure 11:
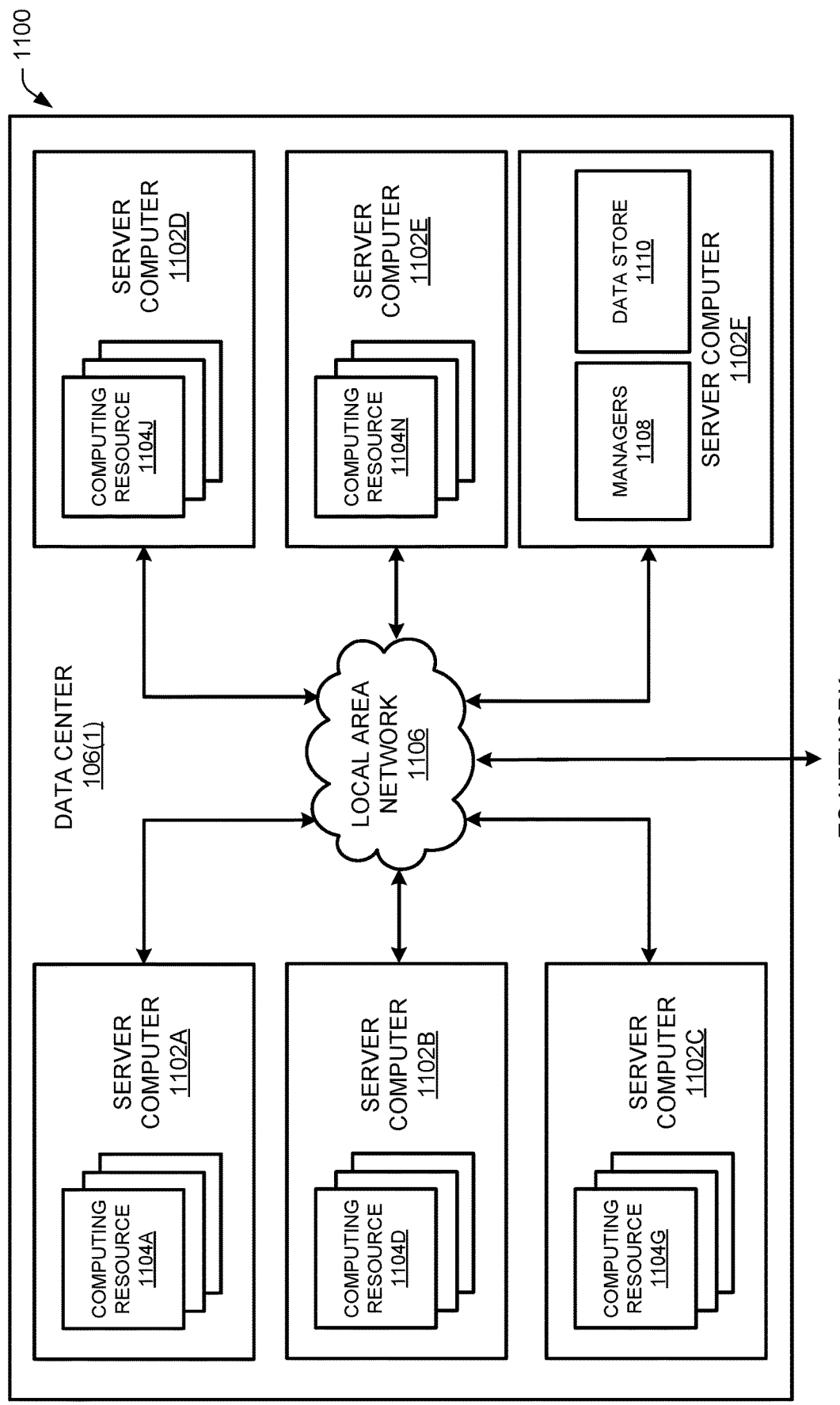
FIG. 11 is a block diagram that illustrates one configuration for a data center that implements aspects of a service provider network, including some or all of the concepts and technologies disclosed herein.

FIG. 11 is a block diagram that illustrates an illustrative architecture 1100 of one configuration for a data center 106 that implements aspects of a service provider network 104, including some or all of the concepts and technologies disclosed herein. The example data center 106(1) shown in FIG. 11 includes several server computers 1102A-1102F (which may be referred to herein singularly as "a server computer 1102" or in the plural as "the server computers 1102") for providing computing resources. The server computers 1102 may be standard tower or rack-mount server computers configured appropriately for providing the computing resources described herein. According to an example, the server computers 1102 are configured to execute the software products as described above.

In an example, some of the computing resources 1104 are virtual machine instances. As known in the art, a virtual machine instance is an instance of a software implementation of a machine (i.e. a computer) that executes programs like a physical machine. Each of the server computers 1102 may be configured to execute an instance manager capable of instantiating and managing computing resources and instances of computing resources. In the case of virtual machine instances, for example, the instance manager might be a hypervisor or another type of program configured to enable the execution of multiple virtual machine instances on a single server computer 1102, for example.

It should be appreciated that although the examples disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 106(1) shown in FIG. 11 also includes a server computer 1102F reserved for executing software components for managing the operation of the data center 106(1), the server computers 1102, virtual machine instances, and other resources within the service provider network 104. The server computer 1102F might also execute a manager 1108 and include a data store 1110. In this regard, it should be appreciated that while these components are illustrated as executing within service provider network 104, computing systems that are external to service provider network 104 might also be utilized to execute some or all of these components. Other configurations might also be utilized.

In the example data center 106(1) shown in FIG. 11, an appropriate local area network ("LAN") 1106 is utilized to interconnect the server computers 1102A-1102E and the server computer 1102F. The LAN 1106 is also connected to the network 110 illustrated in FIG. 10. It should be appreciated that the configuration and network topology illustrated in FIGS. 10 and 11 has been greatly simplified and that many more computing systems, networks and networking devices may be utilized to interconnect the various computing systems disclosed herein. Appropriate load balancing devices or software modules might also be utilized for balancing a load between each of the data centers 106(1)-106(N), between each of the server computers 1102A-1102F in each data center 106 and between virtual machine instances and other types of computing resources provided by the service provider network 104.

It should be appreciated that the data center 106(1) described in FIG. 11 is merely illustrative and that other implementations might also be utilized. Additionally, it should be appreciated that the functionality provided by these components might be implemented in software, hardware, or a combination of software and hardware. Other implementations should be apparent to those skilled in the art.

CONCLUSION

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example examples and applications illustrated and described, and without departing from the true spirit and scope of the present invention, which is set forth in the following claims.

What is claimed is:

1. A system comprising:
one or more processors; and
memory storing computer-implemented instructions that, when executed, cause the one or more processors to:
send a user interface to a user device, the user interface including at least:
an end-user location input control to specify at least one of actual or anticipated locations of end-users of computing resources,
a latency tolerance input control to specify a relative latency tolerance for the computing resources, and
a cost tolerance input control to specify a relative cost tolerance for the computing resources;
obtain location data based on processing of the end-user location input control, a latency value based on processing of the latency tolerance input control, and a cost value based on processing of the cost tolerance input control, the location data including the actual and the anticipated locations of the end-users;
generate a location determination rule set based on the location data, the latency value, and the cost value, the location determination rule set including weights associated with at least the latency value and the cost value, and the location determination rule set being accessible to, and modifiable by, multiple end-users of the end-users, resulting in multiple versions of the location determination rule set customized for different end-users of the multiple end-users;
recommending at least one of the multiple versions of the location determination rule set to at least one end-user based on account data of the at least one end-user;
determine a quantity of locations of physical data service locations based on the location data; and
select one or more physical data service locations using the location determination rule set and based on the quantity of locations, the one or more physical data service locations including an existing physical location of the computing resources to provide at least one of compute services or data storage services.

2. The system as recited in claim 1, wherein the computer-implemented instructions further cause the one or more processors to:
select, at a time after a change in at least one of cost or latency associated with physical data service locations, one or more different physical data service locations using the location determination rule set, and
at least one of:
initiate use of the one or more different physical data service locations for at least one of additional compute services or additional data storage services; or
migrate at least one of the compute services or the data storage services from a first location of the one or more physical data service locations to a second location of the one or more different physical data service locations.

3. The system as recited in claim 1:
wherein the user interface further includes a data compliance input control to specify one or more data compliance requirements for the computing resources,
wherein the computer-implemented instructions further cause the one or more processors to receive data compliance information based on manipulation of the data compliance input control, and wherein determination of the quantity of locations of physical data service locations is based on the data compliance information.

4. The system as recited in claim 1, wherein the computer-implemented instructions further cause the one or more processors to:
   train a machine learning model using training data including at least latency values, cost values, and associated physical location data, the machine learning model configured to at least one of generate or suggest the location determination rule set;
   obtain a selection change to at least one location of the one or more physical data service locations; and
   update the machine learning model based on the selection change.

5. The system as recited in claim 1, wherein the computer-implemented instructions further cause the one or more processors to perform acts to:
   determine a first variance score based on the one or more physical data service locations and a first output of the location determination rule set at a first time;
   determine one or more different physical data service locations using the location determination rule set at a second time after the first time;
   determine a second variance score based on the one or more different physical data service locations and a second output of the location determination rule set at the second time; and
   transmitting a message based on a difference between the first variance score and the second variance score.

6. A non-transitory computer-readable storage medium including computer-executable instructions stored thereupon which, when executed by a computer, cause the computer to:
   obtain a latency selection;
   obtain a cost selection;
   obtain location data indicating actual locations of end-users of one or more computing resources;
   generate a location determination rule set based at least in part on the location data, the latency selection, and the cost selection, the location determination rule set including weights associated with at least a latency value associated with the latency selection and a cost value associated with the cost selection, and the location determination rule set being accessible to, and modifiable by, multiple end-users of the end-users, resulting in multiple versions of the location determination rule set customized for different end-users of the multiple end-users;
   recommending at least one of the multiple versions of the location determination rule set to at least one end-user based at least in part on account data of the at least one end-user; and
   select one or more physical data service locations using the location determination rule set, the one or more physical data service locations including a physical location of the one or more computing resources.

7. The non-transitory computer-readable storage medium as recited in claim 6, wherein the computer-executable instructions further cause the computer to receive a fault tolerance selection that specifies data redundancy of the one or more computing resources, and wherein selection of the one or more physical data service locations is based at least in part on the fault tolerance selection.

8. The non-transitory computer-readable storage medium as recited in claim 6, wherein the computer-executable instructions further cause the computer to determine a quantity of locations of physical data service locations based at last in part on the location data, and wherein selection of the one or more physical data service locations is based at least in part on the quantity of locations.

9. The non-transitory computer-readable storage medium as recited in claim 6, wherein the computer-executable instructions further cause the computer to output a message to indicate at least one alternative selection of one or more different physical data service locations.

10. The non-transitory computer-readable storage medium as recited in claim 6, wherein the computer-executable instructions further cause the computer to receive the location data from a user device via an input to a graphical representation of a map that depicts an area having a plurality of data centers, the input identifying the actual locations of the end-users of the one or more computing resources.

11. The non-transitory computer-readable storage medium as recited in claim 6, wherein the computer-executable instructions further cause the computer to provide the location determination rule set to at least one other entity as a recommended rule set for a different configuration of computing resources.

12. The non-transitory computer-readable storage medium as recited in claim 6, wherein the computer-executable instructions further cause the computer to:
   select, at a time after a change in at least one of cost or latency associated with physical data service locations, one or more different physical data service locations using the location determination rule set; and
   generate a message to communicate an availability of the one or more different physical data service locations.

13. The non-transitory computer-readable storage medium as recited in claim 6, wherein the location determination rule set implements the weights to cause selection of the one or more physical data service locations based at least in part on at least one of:
   first proximity to an area having greater than a threshold population,
   second proximity to existing computing resources,
   data compliance requirements,
   inter-node latency,
   latency to end-user,
   service provider cost, or
   network transmission cost.

14. The non-transitory computer-readable storage medium as recited in claim 6, wherein the computer-executable instructions further cause the computer to:
   train a machine learning model using training data, the machine learning model configured to at least one of generate or suggest the location determination rule set;
   receive a selection change to at least one location of the one or more physical data service locations; and
   train the machine learning model based at least in part on the selection change.

15. A method comprising:
   obtaining user-input parameters via a user interface served to a user device, the user-input parameters including at least a latency value and a cost value;
   obtaining end-user location data from a user device via at least one of one or more inputs via the user interface or a data source of end-user locations;
   generating a location determination rule set based at least in part on the end-user location data and the user-input parameters, the location determination rule set including weights associated with at least the latency value and the cost value, and the location determination rule set being accessible to, and modifiable by, multiple end-users, resulting in multiple versions of the location determination rule set customized for different end-users of the multiple end-users;

recommending at least one of the multiple versions of the location determination rule set to at least one end-user based at least in part on account data of the at least one end-user;

select one or more physical data service locations using the location determination rule set, the one or more physical data service locations including a physical location of one or more computing resources; and deploying the one or more computing resources at the physical location based at least in part on implementation of the location determination rule set.

16. The method as recited in claim 15, further comprising receiving a selection indicating a fault domain diversity preference, and wherein the deploying the one or more computing resources is based at least in part on satisfying the selection indicating the fault domain diversity preference.

17. The method as recited in claim 15, further comprising:
determining, at a later time, one or more different physical data service locations using the location determination rule set; and
outputting the one or more different physical data service locations as options for at least one of data migration to a different location or addition of a new location to the one or more physical data service locations.

18. The method as recited in claim 15, further comprising receiving a data compliance requirement, and wherein the deploying the one or more computing resources includes satisfying the data compliance requirement.

19. The method as recited in claim 15, further comprising determining an elastic capacity expansion of second computing resources at a first location of the one or more physical data service locations based at least in part on the location determination rule set.

20. The method as recited in claim 15, further comprising receiving a user-input to change at least one of a weight of the weights or a parameter of the location determination rule set.

* * * * *